(12) United States Patent
Ley et al.

(10) Patent No.: US 7,742,508 B2
(45) Date of Patent: Jun. 22, 2010

(54) ELECTRO-OPTIC DEFLECTOR

(75) Inventors: John Martin Ley, Brentwood (GB); Clive Lionel Michael Ireland, London Colney (GB)

(73) Assignee: Advanced Optical Technology Ltd., Basildon, Essex (GB)

(*) Notice: Subject to any disclaimer, the term of this patent is extended or adjusted under 35 U.S.C. 154(b) by 317 days.

(21) Appl. No.: 11/873,738

(22) Filed: Oct. 17, 2007

(65) Prior Publication Data
US 2009/0232166 A1    Sep. 17, 2009

(30) Foreign Application Priority Data
Oct. 23, 2006    (GB) ................... 0621115.5

(51) Int. Cl.
*H01S 3/115*    (2006.01)
(52) U.S. Cl. .................. 372/12; 372/10; 372/99; 372/100
(58) Field of Classification Search .......... 372/12, 372/10, 99
See application file for complete search history.

(56) References Cited

U.S. PATENT DOCUMENTS

| | | | | |
|---|---|---|---|---|
| 4,946,264 A * | 8/1990 | Davis | .............. | 359/223.1 |
| 5,045,719 A * | 9/1991 | Ayral et al. | .............. | 359/327 |
| 6,449,084 B1 | 9/2002 | Guo | | |
| 2003/0206675 A1 | 11/2003 | Glebov et al. | | |
| 2004/0076357 A1 | 4/2004 | Maki et al. | | |
| 2008/0130094 A1* | 6/2008 | Tang | .............. | 359/315 |

FOREIGN PATENT DOCUMENTS

GB    1544845    5/1976

OTHER PUBLICATIONS

GB Search Report for Application No. GB0621115.5, Feb. 23, 2007.
Applied Physics B, vol. 67 (1998), pp. 267-270; G.J. Friel et al., "Q-switching of a diode-pumped Nd:YVO4 laser using a quadrupole electro-optic deflector".
IEEE Spectrum, Feb. 1968, pp. 45-52; James F. Lotspeich, "Electrooptic light-beam deflection".

* cited by examiner

*Primary Examiner*—Dung T Nguyen
(74) *Attorney, Agent, or Firm*—Neifeld IP Law, PC (57) ABSTRACT

An electro-optic deflector 51 has an electro-optic material body 519 through which an optical beam 46 is passed. The deflector has no more than three longitudinal electrodes, of which no more than two electrodes 511, 512 have arcuate transverse cross-sections. The electrodes are arranged to create an electric field substantially transverse to a direction of the optical beam to deflect the optical beam passing between the electrodes. The electro-optic deflector has particular application in a Q-switched laser for generating sub-nanosecond optical pulses.

19 Claims, 7 Drawing Sheets

ELECTRO-OPTIC DEFLECTOR

FIELD OF THE INVENTION

This invention relates to an electro-optic deflector and to a Q-switched laser comprising the electro-optic deflector and, in particular, to a nanopulse laser

BACKGROUND OF THE INVENTION

Following the first operation of a laser in 1960, techniques were quickly developed to generate intense optical pulses (R W Hellwarth in '*Advances in Quantum Electronics*'. Columbia Univ Press, New York, p 334-341, (1961) under heading, '*Control of Fluorescent Pulsations*'). A simplest and most widely used arrangement involves use of an optical modulator as a component within a laser oscillator to switch the resonance, or 'Q', of a resonator from 'low' to 'high' after the laser medium has been excited. In this way, a round-trip gain of the oscillator is quickly changed from <1 (below threshold) to >>1 (well above threshold), causing fast build-up and emission of an intense optical pulse. If required, this excitation and switching process can be repeated, in some cases at kHz rates (e.g. U.S. Pat. No. 4,761,786, 'Miniaturized Q-Switched Diode Pumped Solid-State Laser', Baer T M, 2 Aug. 1988).

This Q-switching technique typically allows optical pulses from miniature lasers in the nanosecond (~10-50 ns) duration range to be generated with thousands of times the intensity of a non-Q-switched laser beam. The intense pulses are used in a very wide range of commercial and scientific applications, as well as for much research. For example, established applications of the laser pulses include: distance ranging, remote mapping, air-speed measurement, precision marking (metal and non-metal surfaces), fine cutting of refractory materials (gem stones, semiconductors, ceramics, etc), stimulating chemical reactions and measuring fluorescence decay (e.g. via 'excite and probe' techniques).

Where short intense laser pulses (in the ~10 ns duration range) are required, high speed phase modulators based on Pockels effect solid-state electro-optic (E-O) materials have been widely used in the Q-switch. In a most successful arrangement, the Q-switch comprises a Pockels effect modulator in combination with a polarising element. An electric field, applied by electrodes to the E-O material of the modulator, induces a change in refractive index proportional to the electric field strength. This change in refractive index produces a phase difference between orthogonal polarisation components in the laser radiation field, and a high optical loss at the polariser results. Removing the electric field from the modulator removes the optical loss at the polariser i.e. the Q of the laser can be rapidly switched low and high by switching the E-O modulator voltage on and off (Koechner W. '*Solid-State Laser Engineering*', Ch 8 *Q-Switching*. p 469-519. (1998), $5^{th}$ Edition. Publ by Springer-Verlag, NY, ISBN 3-540-65064-4).

In an alternative scheme Zayhowski ('*Diode-Pumped Microchip Lasers Electro-Optically Q-Switched at High Pulse Repetition Rates*'. *Optic Letters*. p 1201-3, Vol 17, No 17, 1 Sep. 1992, and U.S. Pat. No. 5,381,431, 'Picosecond Q-Switched Microlasers', 10 Jan. 1995) disclosed a novel arrangement that eliminates the polariser and allows miniaturisation by using an E-O phase modulator in the form of a variable thickness optical etalon. In this case, E-O crystal faces are finely polished parallel and made partially reflecting at the selected laser wavelength. By application of a voltage, a resultant small change in refractive index is used to change effective reflectivity (feedback) of the modulator into the miniature laser resonator of which it is a part. In this way, the resonator Q can be switched high/low by application of a controlled voltage step to the E-O crystal. In practice, this coupled laser resonator is very difficult to implement as many factors must be favourable if reliable and consistent performance is to be achieved, for example problems arise because the Q of the 3-element etalon (which comprises the resonator) is sensitive to temperature distribution (pump power/gain), the required mechanical alignment of parts is very high, the change in Q is sensitive to voltage (Q-switch circuit), and the laser operating wavelength (longitudinal mode) may 'hop' under switching conditions. For these reasons and others, the arrangement is believed not to have been implemented outside of a laboratory environment and not to be practicable.

Figure 1:
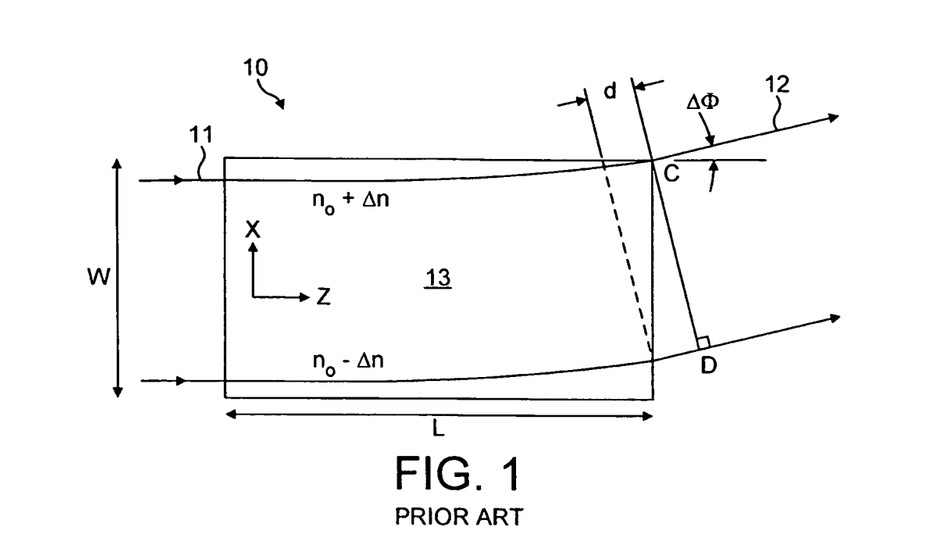
FIG. 1 is a schematic diagram of a prior art gradient E-O deflector modulator.
Figure 2:
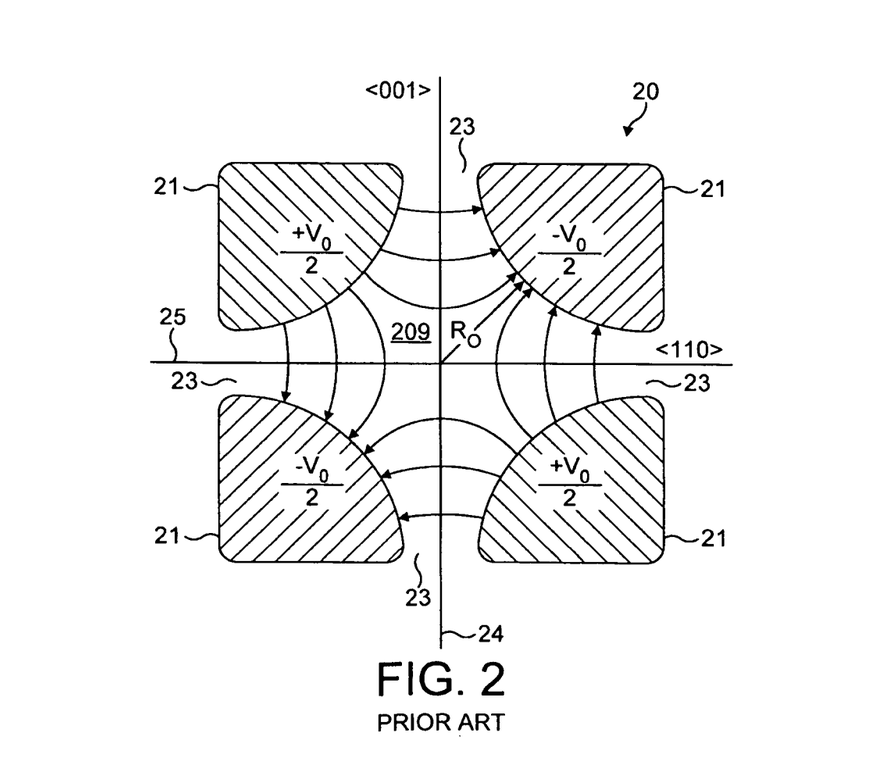
FIG. 2 is a cross-sectional view of a known quadrapole array of electrodes for use in the deflector of FIG. 1.

Rather than generating a phase difference between orthogonal polarisation components, the Pockels effect in an E-O material can be used to produce fast optical modulation by beam deflection. Such a gradient deflector 10 is illustrated in FIG. 1, where by generating a small gradient of the refractive index, from $n_o - \Delta n$ to $n_o + \Delta n$, across an input beam 11, an output beam 12 is deflected i.e. the modulator acts like a weak optical prism (Fowler V J. Buhrer C F, and Bloom L R, *Proc IEEE* (*Corres*). 1964, February 1964). Referring to FIG. 2, in 1968, Lotspeich described the use of a quadrupole electrode arrangement 20 to generate a necessary field and resultant refractive index gradient in a potassium dihydrogen phosphate (KDP) type E-O material (Lotspeich J F, '*Electrooptic Light-Beam Deflection*', *IEEE Spectrum*, p 45-52, February 1968). FIG. 2 is a cross-sectional schematic diagram of a quadrupole array of parallel-rod electrodes 21 to produce a linear variation of refractive index in an x direction within a KDP-type electro-optic material. The proper crystallographic orientations of the <001> and <110> directions are indicated. This deflector type of E-O modulator was proposed for use as an alternative practical laser Q-switch in 1979 (Ireland C L M, '*Some Design Considerations and Applications of a Fast Crystal Deflector*', in *Proc IV Quantum Electron Conf Edinburgh*, pp 87-91, 1979. Pub Wiley, NY (1980)) and a Q-switch, following a design similar to that of FIG. 2 using lithium tantalate ($LiTaO_3$) as the E-O material, was subsequently demonstrated (Friel G. J. Conroy R S, Kemp A. J, Sinclair B D and Ley J M, '*Q-Switching of a Diode-Pumped $Nd:YVO_4$ Laser Using a Quadrupole Electro-Optic Deflector*', *Appl Phys B*, Vol 67, p 267-270 1998).

In principle, the E-O deflector type Q-switch has a number of important advantages over the longer established phase difference type. Unlike the latter, the E-O deflector type Q-switch does not rely on a polariser element to complete the switch. This offers the potential of simplicity of design (single component), greater optical efficiency (reduced optical loss for the resonator in the high-Q state) and reduced optical length (miniaturisation). In the last case, miniaturisation is critical to achieve the shortest pulses from a Q-switched laser, since pulse length scales with resonator (optical) length, provided that good hold-off of the resonator round-trip gain is maintained by the Q-switch in its off (low-Q) state.

Although it has potential advantages as a Q-switch, the deflector type modulator has weaknesses and limitations and it is an objective of this invention to provide key improvements and developments that at least mitigate them. A specific objective is to provide a Q-switch suitable for miniaturisation and use in generating very short, high energy, Q-switched laser pulses e.g. pulses of >10 μJ in the ~100-1000 ps range. Such pulses are very attractive for many applications e.g. (i) for increasing measurement resolution in applications like ranging, aerial mapping and fluorescence diagnostics, and (ii)

significantly to improve fine processing results in materials interactions/modification—see for example US 2005150880, 14 Jul. 2005 to Gu and Smart which teaches the clean breaking of memory links in semiconductor circuits.

To achieve short optical pulses it is well known that a laser resonator requires, (i) a high gain laser material e.g. crystal Nd:YAG, Nd:YVO$_4$ or Nd:GdVO$_4$, (ii) to be excited by a high power source such as a focused beam from a laser diode, and (iii) to use a very short optical resonator. The principles have been widely discussed—see for example, Koechner (1998) ibid and *'Theory of the Optimally Coupled Q-Switched Laser'*, Degnan J J, *IEEE Journal of Quant Electronics*, Vol 25, No 2, pp 214-20, (1989). In the case of generating very short duration (i.e. ~100-1000 ps range) pulses, it is expected that the resonator optical length correspondingly must be very short and in the ~5-15 mm range and the deflector Q-switch, located within the resonator, necessarily be only a few millimeters long i.e. of optical length typically <10 mm.

Since the first operation of the laser, new E-O materials have been identified or developed. In particular, recently rubidium titanyl phosphate (RTP) has become available with some attractive characteristics for use in optical modulators (Lebiush E, Lavi R, Tsuk Y. Angert N, Gachechiladze A, Tseitlin M, Zharov A. and Roth M. in: *Proc of the Topical Meeting on Adv Solid-State Lasers*, Davos, Switzerland, *Trends in Optics & Photonics*, Vol 34, p 6370, (2000)). The best E-O materials are single crystals, usually difficult to grow in high optical quality and are thus expensive to produce in usable size. They are often fragile and require specialist skills to work to the required optical standards/tolerances i.e. manufacturing yield can be poor.

Referring to FIG. 1, the beam deflection $\Delta\Phi$ of a modulator based on an E-O material exhibiting the Pockels effect depends on the crystal aspect ratio (L/W), the appropriate E-O coefficient (r) for the material, and the electric field (E) in the appropriate direction at the aperture limit through the relationship:

$$\Delta\Phi \sim (L/W) \cdot n_o^3 \cdot r \cdot E \quad (1)$$

Here $n_o$ is the refractive index in the appropriate direction of the E-O crystal 13, and $L \cdot n_o$ the optical length. The E-O effect is weak and high electrical field strengths (E typically ~100-2000V/mm) are required to achieve a useful optical effect. For example, with RTP, LiTaO$_3$ or LiNbO$_3$ the E-O coefficient r is ~30 pm/V and $n_o$ is ~2, so that a deflector of ×10 aspect ratio requires a field in the 300V/mm range to provide a milliradian beam deflection. When used as a Q-switch of a high gain laser, the modulator needs to provide a deflection comparable to the laser beam divergence when switching the resonator between low- and high-Q, so as to inhibit losing in the low-Q state. For a miniature solid-state laser with a TEMoo mode beam this angle is typically in the range of a few milliradians (e.g. 2-10 milliradians).

With a sustained high applied electric Field, materials can develop internal crystal damage—ferroelectric domain reorientation and/or ion migration; the latter leading to what appears as 'grey-tracks' in the high field region(s) of the crystal. In addition, the high drive power coupled with the finite conductivity of the material leads to heating that can adversely affect the optical quality of the crystal, distorting the transmitted laser beam via thermo-optic effects if not adequately dissipated.

Many E-O materials exhibit a reverse piezoelectric effect (*'Analysis of the Acoustic Transients in the Pulse Response of the Linear Electro-Optic Effect'*. Veeser H, Bogner U, and Eisenmenger W, *Phys Stat Sol (a)*. Vol 37, p 161-70, 1976). When a pulsed high electric field is applied in these materials it leads to the generation of acoustic waves and resonances, which if not adequately damped, distort and aberrate the optical beam being modulated.

A further complication affecting modulator design is that, to different degrees, E-O materials exhibit optical absorption at laser wavelengths. This comprises a normal (small) linear absorption component and sometimes, under high optical fields, a significant non-linear absorption component e.g. due to the Raman effect (*'Solid-State Raman Laser Generating < Ins Multi-Kilohertz Pulses at 1096 nm'*, Pearce S. Ireland C L M, and Dyer P E, *Optics Comm* Vol 260, p 680-6, 2006). The latter shows up as a power loss via acoustic phonon generation from the optical beam and results in additional heat generation in the Q-switch. If not adequately dissipated, the heat leads to laser beam distortion and aberration via thermo-optic effects.

These difficulties mean that it is most advantageous to design E-O modulators for Q-switches to use short duration voltage pulses of as low amplitude as possible, and include a means of good heat dissipation from the E-O material in their mounting, particularly in the case of high repetition-rate and/or high average laser power applications.

Figure 3A:
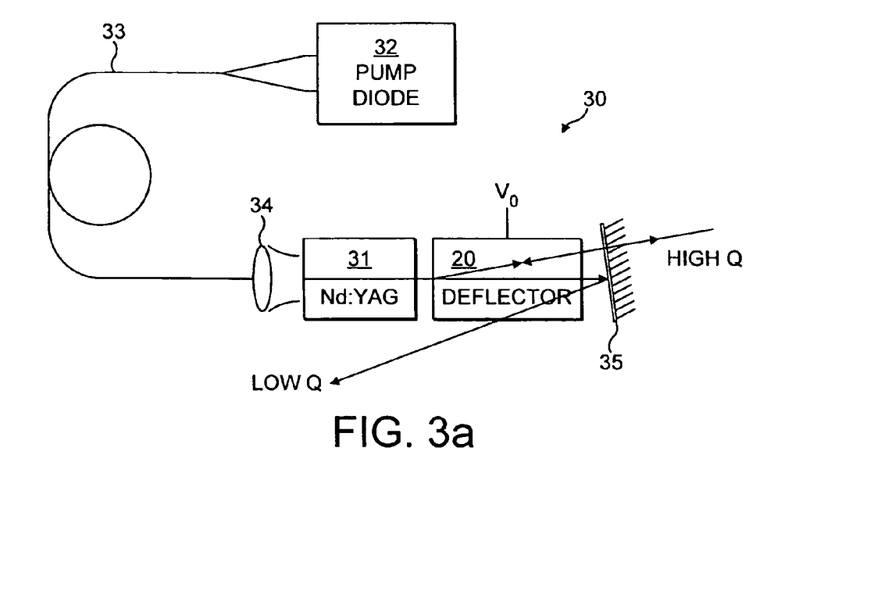
FIGS. 3a and 3b are schematic diagrams of Q-switched oscillators using electro-optic deflectors.
Figure 3B:
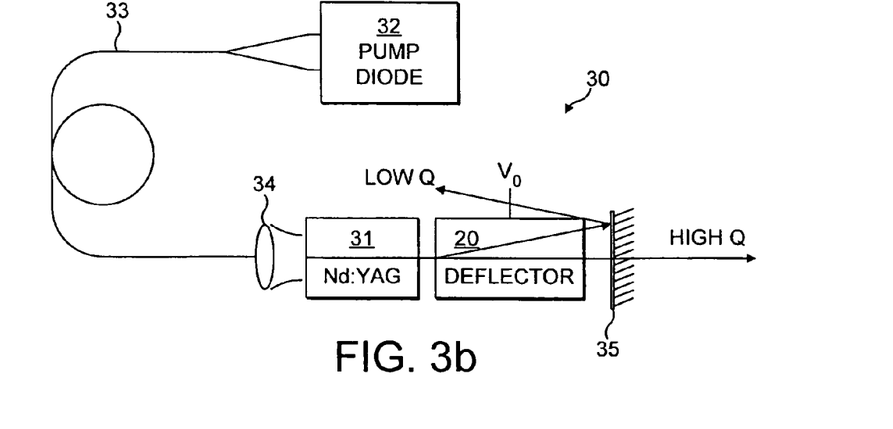

Finally, to different degrees, E-O materials are susceptible to induced optical damage at high laser power densities. A laser damage threshold typically ranges from a few ×10 MW/cm$^2$ to several ×1 GW/cm$^2$ depending on the material and its purity, and this effect greatly limits the choice of E-O materials for practical use in laser applications. The recently grown E-O material RTP and some isomorphs (e.g. KTP in high resistivity form) have relatively good damage resistance to laser intensity and are good candidates in this respect for use in a laser Q-switch For a deflector type laser Q-switch, the prior art comprises a uniform (undistorted) beam deflection using a single E-O crystal with a quadrupole electrode arrangement to produce a near linear electric field gradient in the material as illustrated in FIG. 2. Lotspeich (1968) taught that an optimum quadrupole configuration comprised four electrodes 21 each with a hyperbolic profile running in the beam direction over the length of the crystal 22, suitably orientated to exploit the maximum E-O effect for the particular material. A cross-section of the Lotspeich arrangement with KDP as the E-O material is shown in FIG. 2. In this case, a beam propagating in the z-axis direction, into the plane of FIG. 2, is deflected in the x-z plane when voltage is applied as shown to the quadrupole electrodes 21. FIGS. 3*a* and 3*b* illustrate Q-switched laser resonators 30 in which a Nd:YAG crystal 31 is pumped by a pump diode 32 through an optical fibre 33. Pump light emergent from the fibre is focussed onto a first end face of the Nd:YAG crystal by a focussing lens 34. This first face of the Nd:YAG crystal is coated to be highly reflective at the laser wavelength and transmissive at the pump wavelength. Laser light emergent from a second end face of the Nd:YAG crystal passes though a first end face of the E-O material deflector 20. Laser light emergent from a second end face of the deflector 20 is incident on a partially reflective mirror 35. In use, an angle change $\Delta\Phi$ imposed on the beam by the deflector allows the beam deflector to be used as a Q-switch for the laser resonator 31, 20, 35, either, as in FIG. 3*a*, using an applied voltage $V_0$ to switch the resonator Q (i.e. effectively alignment of the mirror 35) from low to high, or, as shown in FIG. 3*b*, from high to low.

As noted previously, in effect, the deflector 20 acts as a small angle optical prism where the angle $\Delta\Phi$ can be turned on/off in a controlled manner by applying the voltage $V_0$ and electric field to the crystal. The optical switching speed is as fast as the electric field switching speed which is primarily determined by the electrical capacitance of the Q-switch i.e. to achieve a fast deflector requires a low capacitance and high driving current (see p 76-80 in 'Electro-Optic and Acousto-Optic Scanning and Deflection', Gottlieb M, Ireland C L M, and Ley J M, in *Optical Engineering Series*, Pub 1983 by Marcel Dekker Inc; NY. ISBN:0-8247-1811-9).

Since electrodes 21 of hyperbolic profile are very difficult to fabricate. Ireland (1979) calculated the effect on field linearity of replacing hyperbolic electrodes by simpler cylindrical electrodes in the quadrupole configuration. He showed that, with an appropriate choice of radius, cylindrical electrodes could be used without introducing a severe field distortion which, otherwise, would have led to optical aberration being impressed on the beam. In this case, the estimated wavefront aberration was ~$\lambda/2$ (where $\lambda$ was the optical wavelength), and was at least no worse than that calculated due to the grinding and positional errors of the electrodes in the fabrication of the device. Using $LiNbO_3$ as the E-O material, Ireland (1979) reported beam deflection experiments validating his design.

Whether based on prior-art hyperbolic or the simpler cylindrical shape, the quadrupole electrode arrangement for a deflector Q-switch is very difficult to manufacture, and becomes particularly so as the deflector size is scaled-down into the millimeter range. In the 'wings' 23 (region of highest electric field—see FIG. 2) of the crystal 209, the thickness becomes very small (i.e. significantly less than 1 mm) and breakage during fabrication readily occurs in this area. When attempting further miniaturisation of the Q-switch, the required electrode grinding and positional tolerances translate into progressively tighter control of dimensions i.e. the tolerances move into the few microns range. Such alignment is extremely difficult to achieve in the case of four electrodes 21, which not only must be aligned relative to the appropriate axes of the E-O crystal 209, but to each other. For these reasons, the miniaturisation of the prior-art is severely limited. An additional important constraint of the prior-art is the difficulty of mounting the shaped E-O crystal to provide good heat removal and acoustic damping without inducing stress or breakage when employed as a laser Q-switch.

It is an object of the present invention at least to ameliorate the aforesaid disadvantages in the prior art.

SUMMARY OF THE INVENTION

According to a first aspect of the invention there is provided an electro-optic deflector comprising an electro-optic material for passing an optical beam therethrough and no more than three longitudinal electrodes, comprising one of: two mutually inclined planar electrodes; and one or two electrodes with arcuate transverse cross-sections, arranged to create an electric field gradient substantially transverse to a direction of the optical beam to deflect the optical beam passing between the electrodes.

Conveniently, the electro-optic deflector comprises: a longitudinal arcuate electrode with an outwardly concave cross-section forming substantially a quadrant of a circle and having an axis substantially parallel to a direction of the optical beam; a first planar longitudinal electrode having a major axis substantially parallel to the direction of the optical beam and substantially parallel to a first tangent to the arcuate electrode at a first end of the arcuate electrode and spaced therefrom; and a second planar longitudinal electrode orthogonal lo the first planar electrode and substantially parallel to the direction of the optical beam and substantially parallel to a second tangent to the arcuate electrode at a second end of the arcuate electrode and spaced therefrom; wherein the electrodes form a single quadrant of an otherwise quadrupole array.

Optionally, the electro-optic deflector comprises: a first longitudinal arcuate electrode with an outwardly concave cross-section forming substantially a quadrant of a circle and having an axis substantially parallel to a direction of the optical beam; a second longitudinal arcuate electrode, mirroring the first arcuate electrode, with an outwardly concave cross-section forming substantially a quadrant of a circle and having an axis substantially parallel to a direction of the optical beam a first planar longitudinal electrode substantially parallel to the direction of the optical beam; and a planar longitudinal electrode substantially parallel to the direction of the optical beam and to a tangent to the arcuate electrode at a first end of the first arcuate electrode remote from the second arcuate electrode and parallel to a tangent to the second arcuate electrode at an end of the electrode remote from the first electrode and spaced therefrom; wherein the electrodes form two quadrants of an otherwise quadrupole array.

Optionally, the electro-optic deflector comprises: a longitudinal arcuate electrode with an outwardly concave cross-section forming substantially a quadrant of a circle and having an axis substantially parallel to a direction of the optical beam; a first planar longitudinal electrode having a major axis substantially parallel to the direction of the optical beam and substantially parallel to a second tangent to the arcuate electrode cross-section at a second end of the arcuate electrode and spaced therefrom; wherein the electrodes form a single quadrant of an otherwise quadrupole array except that the electro-optic material extends substantially further in a direction of the second tangent orthogonal to the beam direction and substantially orthogonal to a first tangent to the arcuate electrode at a first end of the arcuate electrode cross-section than in a direction of the first tangent.

Optionally, the electro-optic deflector comprises: a first longitudinal arcuate electrode with an outwardly concave cross-section forming substantially a quadrant of a circle and having an axis substantially parallel to a direction of the optical beam; a second longitudinal arcuate electrode, mirroring the first arcuate electrode, with an outwardly concave cross-section forming substantially a quadrant of a circle and having an axis substantially parallel to a direction of the optical beam a first planar longitudinal electrode substantially parallel to the direction of the optical beam, wherein the electrodes form two quadrants of an otherwise quadrupole array except that the electro-optic material extends substantially further in a direction orthogonal to the beam direction and substantially orthogonal to a tangent to the first and second arcuate electrodes at ends of the cross-sections of the arcuate electrode remote from each other, than in a direction of the tangent.

Optionally, the electro-optic deflector comprises: a longitudinal arcuate electrode with an outwardly concave cross-section forming substantially a semicircle and having an axis substantially parallel to a direction of the optical beam; a planar longitudinal electrode having a major axis substantially parallel to the direction of the optical beam and substantially parallel lo a tangent to the arcuate electrode cross-section at a midpoint thereof and spaced therefrom; wherein the electrodes form two quadrants of an otherwise quadrupole array except that the electro-optic material extends substantially further in a direction orthogonal to the beam direction and substantially in a direction of the planar electrode than in a direction orthogonal thereto.

Optionally, the electro-optic deflector comprises: a first planar longitudinal electrode having a major axis substantially parallel to the direction of the optical beam; a second planar longitudinal electrode, inclined to the first planar electrode, having a major axis substantially parallel to the direction of the optical beam; wherein the electro-optic material extends substantially further in a direction orthogonal to the beam direction and away from the planar electrodes than in a direction orthogonal thereto.

Conveniently, the second planar electrode is inclined to the first planar electrode at substantially a right angle and the electro-optic material extends in a direction at substantially 45 deg. to the first planar electrode and the second planar electrode.

Alternatively, the second planar electrode is inclined to the first planar electrode at substantially 45 deg. and the electro-optic material extends in a direction defined by the second planar electrode.

Preferably, the electro-optic material extends sufficiently to provide a purchase for holding the material during forming of the electrodes.

Advantageously, the electro-optic material extends sufficiently to provide a surface area sufficient for efficient heat conduction and dissipation to a mount of the deflector.

Advantageously, the electro-optic material extends sufficiently to provide a surface area sufficient for damping acoustic waves via appropriate acoustic impedance to a mount of the deflector.

Preferably, the electro-optic deflector has an optical length of no more than 10 mm.

Preferably, the optical beam deflection is at least 1 mrad.

Conveniently, the electro-optic material is rubidium titanyl phosphate (RTP).

Conveniently, the electro-optic material is high resistivity potassium titanyl phosphate (KTP).

According to a second aspect of the invention, there is provided a Q-switched laser for generating sub-nanosecond duration optical pulses comprising an electro-optic deflector comprising an electro-optic material for passing an optical beam therethrough and no more than three longitudinal electrodes, comprising one of: two mutually inclined planar electrodes; and one or two electrodes with arcuate transverse cross-sections, arranged to create an electric field gradient substantially transverse to a direction of the optical beam to deflect the optical beam passing between the electrodes.

Conveniently, the Q-switched laser comprises laser gain material of one of Nd:YAG, Nd:YVO$_4$ and NdGdVO$_4$.

Advantageously, the Q-switched laser is diode pumped.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Throughout the description, identical reference numerals are used to identify like parts.

Referring to FIG. 2, in principle, a field gradient of a Q-switch of quadrupole design with perfect hyperbolic electrodes 21 (correctly positioned), is constant in the required deflection direction across its full aperture. As a result, it is not necessary for a laser beam to pass through a centre of the Q-switch. For a fixed voltage applied to the electrodes, at any location in the aperture, the beam will be subject to the same deflection.

From FIG. 2, it can be seen that a quadrupole electrode 21 configuration gives rise to two orthogonal planes of symmetry 24, 25 intersecting at a centre of the device 20. The planes are equi-potential surfaces, and in this case the constant potential is zero. The crystal orientation, axes for the planes, is dependent on the deflector material, and chosen to use the E-O effect that maximises the deflection angle. Lotspeich (1968) uses KDP for the E-O material, and the planes are y-z and x-z, intersecting along the origin in the z-axis direction. In the case where LiNbO$_3$ is used as the E-O material by Ireland (1979), the equi-potential planes arc y-z and x-y, intersecting through the origin in an y-axis direction.

Figure 4A:
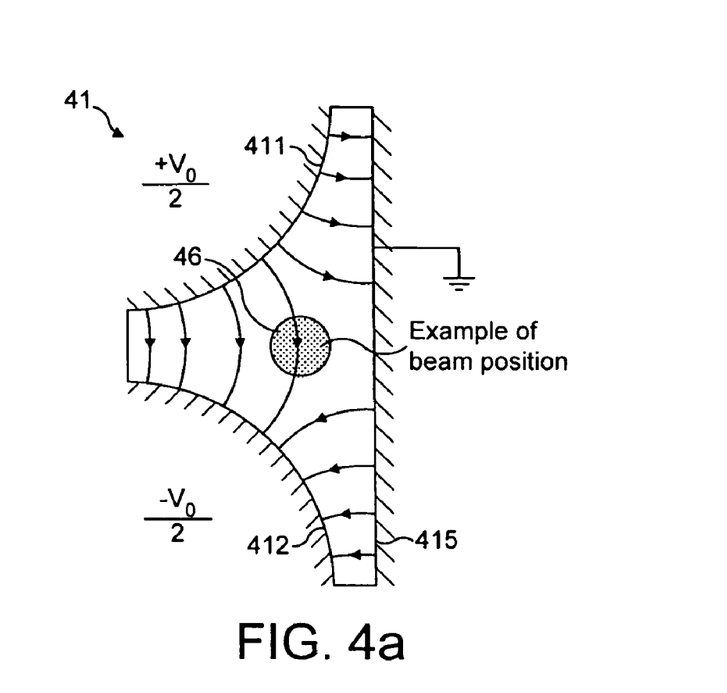
FIG. 4a is a cross-sectional view of a first two quadrant embodiment of an E-O deflector according to the invention.
Figure 4B:
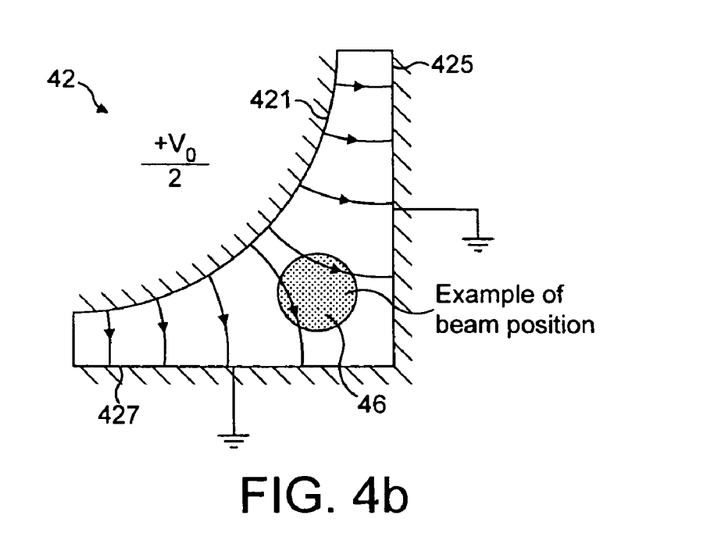
FIG. 4b is a cross-sectional view of a first one quadrant embodiment of an electro-optic deflector according to the invention.

As a consequence of the electric field symmetry, it will be seen from FIG. 2 that it is possible to consider a quadrupole E-O deflector as comprising either; (i) two similar halves or (ii) four similar quadrants. This allows new deflectors to be conceived giving a same beam deflection. Using plane electrodes 415; 425, 427 (equi-potential surfaces) positioned along what would have been one or both of the symmetry planes 24, 25, possible Q-switches of simpler geometry result. FIGS. 4a and 4b show electrode arrangements 411, 412; 421, which are arcuate in cross-section, of these two new deflectors 41, 42. In the case of the first deflector 41, illustrated in FIG. 4a, the deflector corresponds to two quadrants of the known quadrupole deflector 20 illustrated in FIG. 2 so that the number of shaped electrodes 411, 412 is reduced from four in the prior art to two, with one plane electrode 415. In the embodiment 42 illustrated in FIG. 4b the deflector 42 corresponds to only one quadrant of the known quadrupole deflector 20 illustrated in FIG. 2 so that there is only one shaped electrode 421 and two mutually orthogonal plane electrodes 425, 427. To make use of deflectors of either geometry it is self-evident that the beam 46 must be displaced from the origin, that is the intersection of the two symmetry planes 24, 25 of the original quadrupole electrodes 21, anywhere into the clear aperture region of each new deflector 41, 42. In FIGS. 4a and 4b the circles 46 indicate possible beam positions.

Although simpler, the geometry of each deflector 41, 42 illustrated in FIG. 4a and particularly in FIG. 4b, respectively, can be improved to: (i) considerably reduce crystal fabrication problems, (ii) allow easy mounting to remove waste heat and to damp acoustic waves, and (iii) facilitate miniaturisation (particularly reduction of crystal length L) to provide a simple, very short Q-switch for a miniature laser i.e. achieve optical length $L \cdot n_o$ in the range below 10 mm.

As noted earlier, the location of the laser beam 46 in an aperture of a quadrupole deflector 20 is not critical to Q-switch operation e.g. performance is tolerant to the transverse position of the beam 46 relative to the aperture centre. It will be understood that, due to symmetry, this is also the case for the deflectors 41 and 42 illustrated in FIGS. 4a and 4b with simpler electrodes 411, 412; 421. With the known quadrupole deflector 20, when the beam 46 is so located towards one of the wings 23 (high field region) of the crystal, the contribution to the field from the two nearer electrodes 21 increases, and that from the other pair decreases. In the limit (towards the extreme of the aperture) the two closest electrodes 21 dominate in controlling the linear field gradient. This can be seen from the electric field lines indicated schematically in FIG. 2 from Lotspeich (1968) i.e. where the field lines become short and close to unidirectional.

Figure 5A:
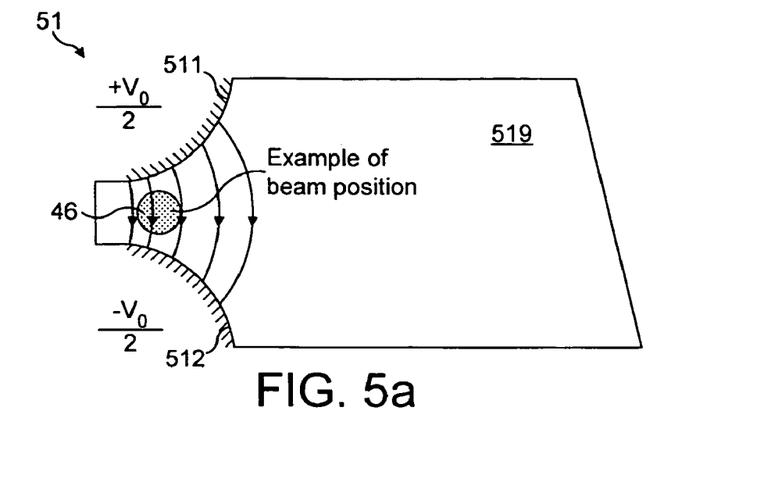
FIG. 5a is a cross-sectional view of a second two quadrant embodiment of an electro-optic deflector according to the invention.

This dominance of the contribution of the nearest electrodes 21 to the electric field (in the case where the laser beam 46 is directed through the high field region 23), allows the deflector geometries of FIGS. 4a and 4b to be simplified further. New Q-switch deflector options 51, 52, 53 result, indicated schematically in FIGS. 5a, 5b and 5c. It will be seen that the deflector 51 in FIG. 5a is developed from deflector 41 illustrated in FIG. 4a. The positioning of the laser beam 46 towards the high field region allows dispensing with the zero potential electrode (the vertical electrode 415 in the schematic of FIG. 4a) and most importantly, extension of the E-O crystal 519 to a convenient dimension transverse to the beam direction i.e. in the horizontal direction in FIG. 5a. Similarly, it will be seen that the deflector 52 in FIG. 5b (developed from deflector 42 illustrated in FIG. 4b) is of particularly simple design. The positioning of the laser beam 46 towards the high field region allows removal of one of the zero potential electrodes (the vertical electrode 425 in the schematic of FIG. 4b) and, most importantly, extension of the E-O crystal 529 to a convenient dimension transverse to the beam direction i.e. in the horizontal direction in FIG. 5b. The result is additional simplification of the electrode geometries, and the opportunity to make the E-O crystals 519 and 529 arbitrarily large in a non-critical direction. The latter is an important advantage as it overcomes a practical limitation of short length in the handling and fabrication (e.g. optical polishing, fine grinding, electroding and AR coating of the optical faces) of miniature aperture deflector crystals e.g. for use as a fast Q-switch. In the case of the extended single quadrant deflector 52 shown in FIG. 5b, it also provides an opportunity of simple mounting of the E-O crystal 529 with the plane electrode 527 against a suitable plane surface for efficient heat dissipation and acoustic damping.

Figure 5B:
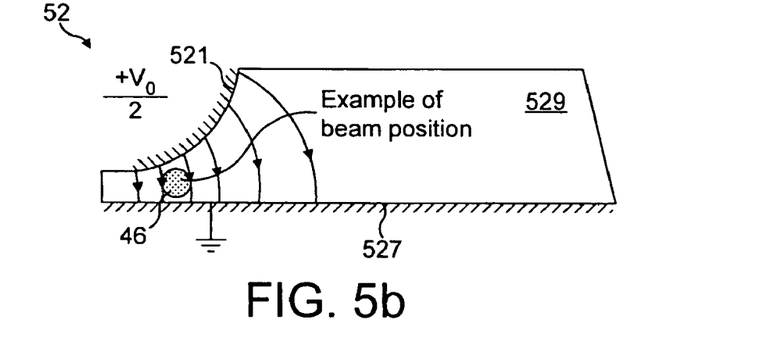
FIG. 5b is a cross-sectional view of a second one quadrant embodiment of an electro-optic deflector according to the invention.
Figure 5C:
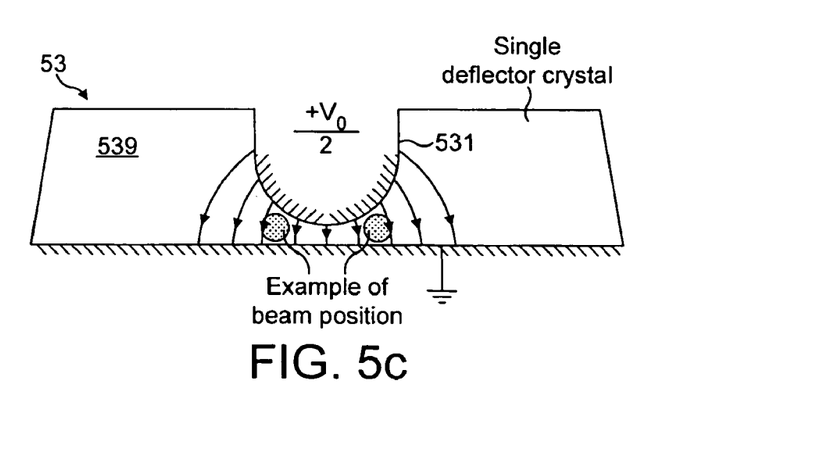
FIG. 5c is a cross-sectional view of a further two-quadrant embodiment of an electro-optic deflector according to the invention.

FIG. 5c represents a deflector 53 which is a more practical two-quadrant extension of the simple transversely extended deflector 52 of FIG. 5b. The deflector 53 retains the attractive features noted above but, importantly, also mitigates the risk of electrical tracking/breakdown over the short distance between the electrodes 521, 527 around the very narrow tip of the crystal in the single-quadrant extended deflector 52 illustrated in FIG. 5b. The improved mirrored-quadrant extended deflector 53 shown in FIG. 5c, uses a same basic geometry as the extended single quadrant deflector 42 but the shaped crystal 539 includes a 'mirror image'. In the case of this improved design, a same simple cylindrical profile electrode 531 can be used but without risk of the very short surface tracking distance of the single quadrant deflector 42. Further practical advantages of the modified mirrored-quadrant deflector 53 of FIG. 5c are that it: (i) facilitates straightforward jigging for the accurate grinding of the cylindrical electrode 531, and (ii) provides redundancy i.e. two possible mirror-image locations 461, 462, as indicated, are available for the position of the laser beam through the device to provide Q-switching.

Figure 6A:
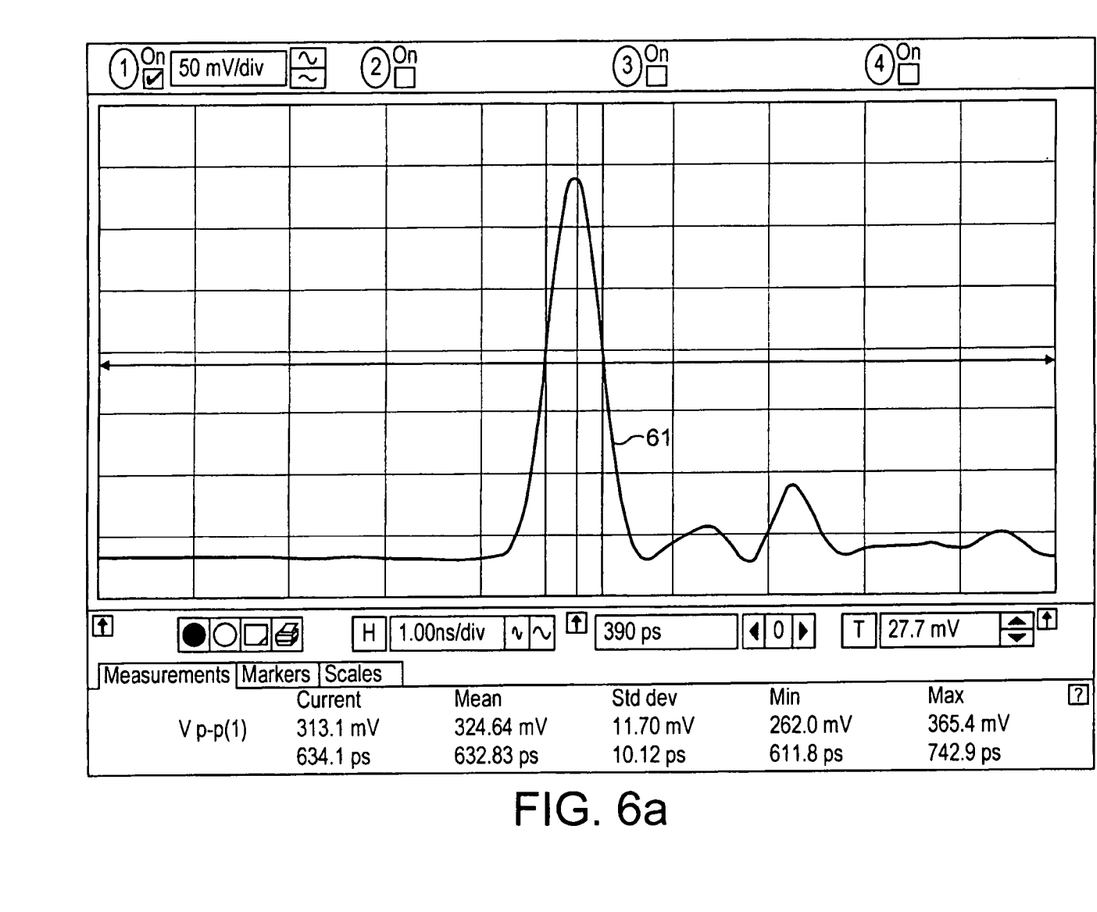
FIG. 6a is a graph of pulses produced by a laser using an electro-optic deflector according to the invention.

FIG. 6 shows an image 61 recorded from an oscilloscope of a ~500 ps duration TEMoo pulse of ~20 µJ energy from a miniature Nd:YVO$_4$ laser operating at 5 kHz and which incorporated a ~5 mm optical length Q-switch of the mirrored quadrant deflector 53 illustrated in FIG. 5c.

Figure 6B:
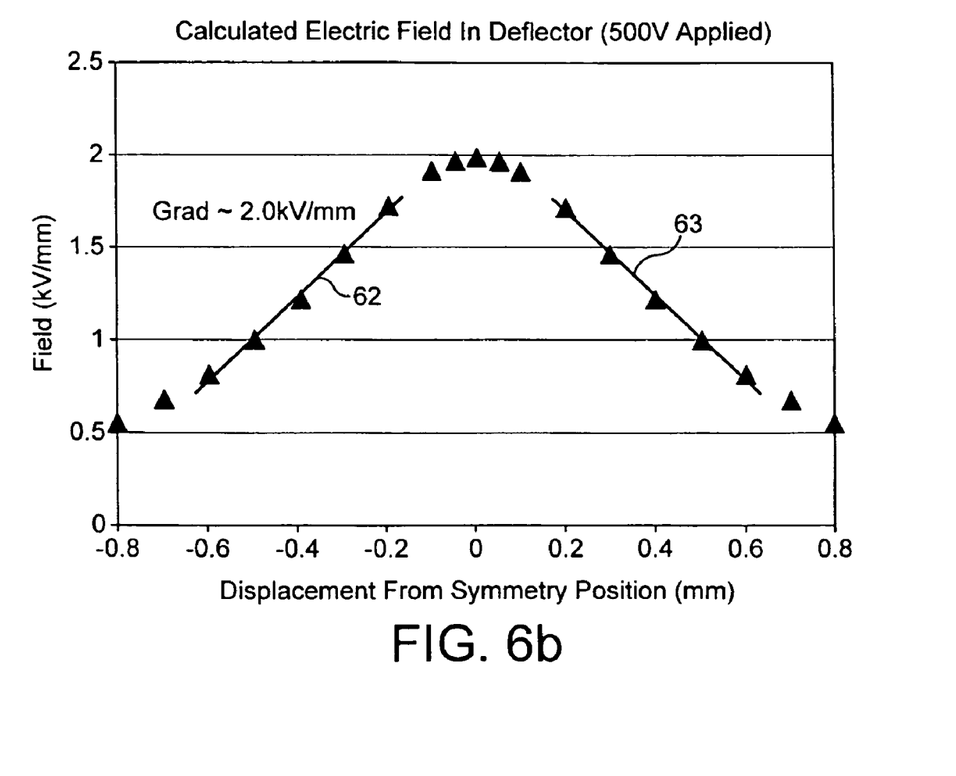
FIG. 6b is a graph of a calculated electric field in a Q-switch according to the invention.

FIG. 6b shows a calculated plot of an electric field in the mirrored quadrant deflector 53 illustrated in FIG. 5c for a 500 V applied pulse. It is apparent that there are two symmetric regions 62, 63 where there is an approximately linear field gradient. Each region extends over approximately 0.4 mm, which is suitably approximately twice a diameter of a suitable laser beam.

It will be understood that with some high resistivity stable E-O materials, it is possible to operate a deflector modulator with a field applied for considerable time periods without deleterious effects occurring. In this case, the deflector Q-switch operating mode of FIG. 3b becomes a practical option. Here, the Q-switch operates in the mode where the applied voltage (V) is high to provide a low-Q resonator (for the extended period while the laser gain medium is excited), followed by V low (ie V~0 Volts) to give the resonator high-Q, and allow rapid laser pulse generation and emission.

Most importantly, in this mode of operation, the laser pulse is generated and emitted under conditions where there is substantially no voltage (V~0 Volts) on the Q-switch. As a result, the uniformity of the field gradient with V high on the deflector is not important to laser performance. With V high, the key requirement is only that the deflector sufficiently lowers the resonator Q as to inhibit laser oscillation. It will be understood that a uniform beam deflection across the beam aperture (i.e. as provided by a linear field gradient) is not particularly required in this case. Other field distributions provided by much simpler electrode geometries applied to the deflector become possible for a practical Q-switch operating in this mode.

Figure 7A:
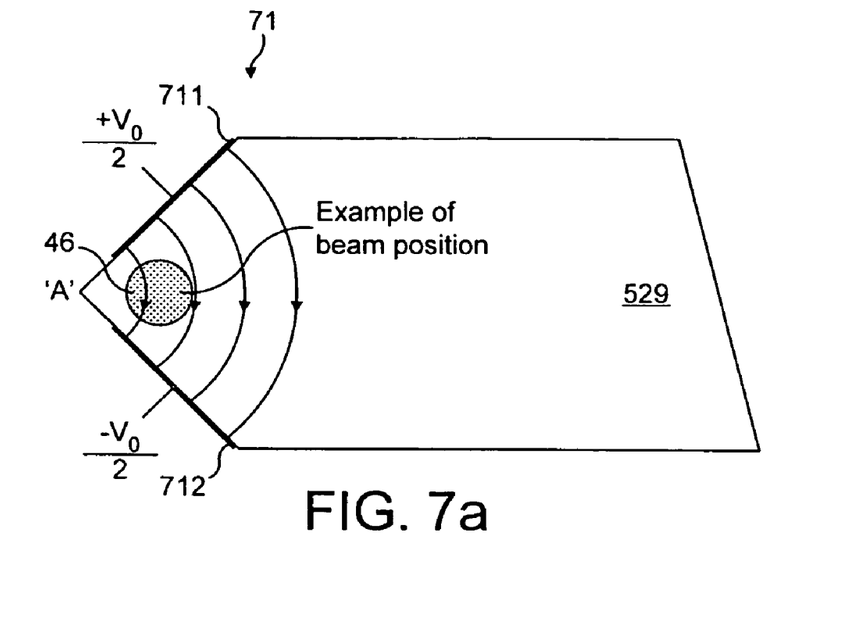
FIG. 7a is a cross-sectional view of a first two-plane electrode embodiment of an electro-optic deflector according to the invention.
Figure 7B:
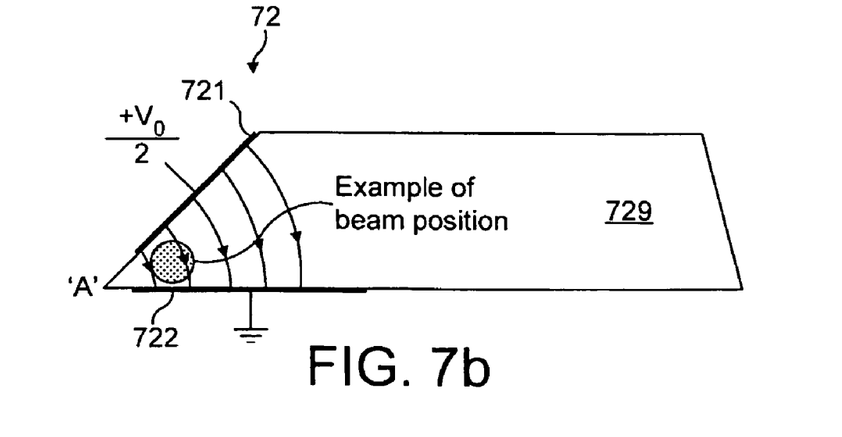
FIG. 7b is a cross-sectional view of a second two-plane electrode embodiment of an electro-optic deflector according to the invention.

FIGS. 7a and 7b show two examples of possible crystal and electrode geometries 71, 72 for Q-switches based on the immediately preceding discussion. They are modifications of the preferred deflectors 51, 52 illustrated in FIGS. 5a and 5b, respectively, but with the requirement to provide a near constant electric field gradient dropped. In both the deflectors 71, 72 of FIGS. 7a and 7b the electrodes 711, 712; 721, 722 are plane and, for convenience, inclined to each other by ~90° and ~45°, respectively—although other angles will be similarly effective. FIGS. 7a and 7b represent examples of the simplest (i.e. two electrode) geometry deflectors possible for a deflector Q-switch using an electric field gradient.

By inspection of FIGS. 7a and 7b, it is readily seen that the length of the field lines between the electrodes increases approximately linearly with distance from the apex A of the crystal i.e. the electric field decreases highly non-linearly, approximately hyperbolically, with distance, with the gradient highest closest to the apex A. As a result, with the electric field applied, laser beam deflection changes with distance from the apex, and is highest close lo the apex.

Used as a laser Q-switch, the hold-off of resonator gain by the deflectors 71, 72 of FIGS. 7*a* and 7*b* can be set by a combination of deflector voltage and position, i.e. location of the beam 46 relative to the crystal apex A. As with the Q-switch deflectors 51, 52 in FIGS. 5*a* and 5*b*, those of FIGS. 7*a* and 7*b* retain similar practical benefits associated with fabrication, miniaturisation, ease of mounting for waste heat dissipation and acoustic damping.

It will be apparent to those skilled in the art of E-O crystal preparation and use that the embodiments 51, 52, 53, 71, 72 of deflector Q-switches in FIGS. 5*a*, 5*b*, 5*c* and FIGS. 7*a* and 7*b* require care in their implementation, (i) to avoid leakage current/breakdown by surface tracking over the crystal surfaces between electrodes at different potentials, (ii) to minimise stress during plating of electrodes and crystal mounting, and (iii) in the choice of compatible materials for heat conduction and damping for a practical and reliable Q-switch. It will also be apparent to those skilled in the art that the E-O deflectors disclosed will have many other applications for optical beam deflection and modulation besides use as a fast laser Q-switch, and that operation with high bandwidth and/or high pulse repetition rate requires careful design of the electronic switching or modulating circuit, including the electrical connections to the deflector Although the present invention has been described with reference to preferred embodiments, workers skilled in the art will recognize that changes may be made in form and detail without departing from the spirit and scope of the invention.

We claim:

1. An electro-optic deflector comprising an electro-optic material for passing an optical beam therethrough and no more than three longitudinal electrodes, comprising one of: two mutually inclined planar electrodes; and one or two electrodes with arcuate transverse cross-sections, arranged to create an electric field gradient substantially transverse to a direction of the optical beam to deflect the optical beam passing between the electrodes.

2. An electro-optic deflector as claimed in claim 1, comprising:
   a. a longitudinal arcuate electrode with an outwardly concave cross-section forming substantially a quadrant of a circle and having an axis substantially parallel to a direction of the optical beam;
   b. a first planar longitudinal electrode having a major axis substantially parallel to the direction of the optical beam and substantially parallel to a first tangent to the arcuate electrode at a first end of the arcuate electrode and spaced therefrom; and
   c. a second planar longitudinal electrode orthogonal to the first planar electrode and substantially parallel to the direction of the optical beam and substantially parallel to a second tangent to the arcuate electrode at a second end of the arcuate electrode and spaced therefrom;
   d. wherein the electrodes form a single quadrant of an otherwise quadrupole array.

3. An electro-optic deflector as claimed in claim 1, comprising:
   a. a first longitudinal arcuate electrode with an outwardly concave cross-section forming substantially a quadrant of a circle and having an axis substantially parallel to a direction of the optical beam;
   b. a second longitudinal arcuate electrode, mirroring the first arcuate electrode, with an outwardly concave cross-section forming substantially a quadrant of a circle and having an axis substantially parallel to a direction of the optical beam a first planar longitudinal electrode substantially parallel to the direction of the optical beam; and
   c. a planar longitudinal electrode substantially parallel to the direction of the optical beam and to a tangent to the arcuate electrode at a first end of the first arcuate electrode remote from the second arcuate electrode and parallel to a tangent to the second arcuate electrode at an end of the electrode remote from the first electrode and spaced therefrom;
   d. wherein the electrodes form two quadrants of an otherwise quadrupole array.

4. An electro-optic deflector as claimed in claim 1, comprising:
   a. a longitudinal arcuate electrode with an outwardly concave cross-section forming substantially a quadrant of a circle and having an axis substantially parallel to a direction of the optical beam;
   b. a first planar longitudinal electrode having a major axis substantially parallel to the direction of the optical beam and substantially parallel to a second tangent to the arcuate electrode cross-section at a second end of the arcuate electrode and spaced therefrom;
   c. wherein the electrodes form a single quadrant of an otherwise quadrupole array except that the electro-optic material extends substantially further in a direction of the second tangent orthogonal to the beam direction and substantially orthogonal to a first tangent to the arcuate electrode at a first end of the arcuate electrode cross-section than in a direction of the first tangent.

5. An electro-optic deflector as claimed in claim 1, comprising:
   a. a first longitudinal arcuate electrode with an outwardly concave cross-section forming substantially a quadrant of a circle and having an axis substantially parallel to a direction of the optical beam; and
   b. a second longitudinal arcuate electrode, mirroring the first arcuate electrode, with an outwardly concave cross-section forming substantially a quadrant of a circle and having an axis substantially parallel to a direction of the optical beam a first planar longitudinal electrode substantially parallel to the direction of the optical beam;
   c. wherein the electrodes form two quadrants of an otherwise quadrupole array except that the electro-optic material extends substantially further in a direction orthogonal to the beam direction and substantially orthogonal to a tangent to the first and second arcuate electrodes at ends of the cross-sections of the arcuate electrode remote from each other, than in a direction of the tangent.

6. An electro-optic deflector as claimed in claim 1, comprising:
   a. a longitudinal arcuate electrode with an outwardly concave cross-section forming substantially a semicircle and having an axis substantially parallel to a direction of the optical beam; and
   b. a planar longitudinal electrode having a major axis substantially parallel to the direction of the optical beam and substantially parallel to a tangent to the arcuate electrode cross-section at a midpoint thereof and spaced therefrom;
   c. wherein the electrodes form two quadrants of an otherwise quadrupole array except that the electro-optic material extends substantially further in a direction orthogonal to the beam direction and substantially in a direction of the planar electrode than in a direction orthogonal thereto.

7. An electro-optic deflector as claimed in claim 1, comprising:
   a. a first planar longitudinal electrode having a major axis substantially parallel to the direction of the optical beam; and
   b. a second planar longitudinal electrode, inclined to the first planar electrode, having a major axis substantially parallel to the direction of the optical beam;
   c. wherein the electro-optic material extends substantially further in a direction orthogonal to the beam direction and away from the planar electrodes than in a direction orthogonal thereto.

8. An electro-optic deflector as claimed in claim 7, wherein the second planar electrode is inclined to the first planar electrode at substantially a right angle and the electro-optic material extends in a direction at substantially 45 deg. to the first planar electrode and the second planar electrode.

9. An electro-optic deflector as claimed in claim 7, wherein the second planar electrode is inclined to the first planar electrode at substantially 45 deg. and the electro-optic material extends in a direction defined by the second planar electrode.

10. An electro-optic deflector as claimed in claim 1, wherein the electro-optic material extends sufficiently to provide a purchase for holding the material during forming of the electrodes.

11. An electro-optic deflector as claimed in claim 1, wherein the electro-optic material extends sufficiently to provide a surface area sufficient for efficient heat conduction and dissipation to a mount of the deflector.

12. An electro-optic deflector as claimed in claim 1, wherein the electro-optic material extends sufficiently to provide a surface area sufficient for damping acoustic waves via appropriate acoustic impedance to a mount of the deflector.

13. An electro-optic deflector as claimed in claim 1 having a optical length of no more than 10 mm.

14. An electro-optic deflector as claimed in claim 1, wherein the optical beam deflection is at least 1 mrad.

15. An electro-optic deflector as claimed in claim 1, wherein the electro-optic material is rubidium titanyl phosphate (RTP).

16. An electro-optic deflector as claimed in claim 1, wherein the electro-optic material is high resistivity potassium titanyl phosphate (KTP).

17. A Q-switched laser for generating sub-nanosecond duration optical pulses comprising an electro-optic deflector comprising an electro-optic material for passing an optical beam therethrough and no more than three longitudinal electrodes, comprising one of two mutually inclined planar electrodes; and one or two electrodes with arcuate transverse cross-sections, arranged to create an electric field gradient substantially transverse to a direction of the optical beam to deflect the optical beam passing between the electrodes.

18. A Q-switched laser as claimed in claim 17, comprising laser gain material of one of Nd:YAG, Nd:YVO$_4$ and Nd:GdVO$_4$.

19. A Q-switched laser as claimed in claim 17, wherein the laser is diode pumped.

* * * * *